Oct. 25, 1938.                L. A. VERNEY                 2,134,628
                        VEHICLE COUPLING DEVICE
                         Filed Dec. 8, 1937            2 Sheets-Sheet 1
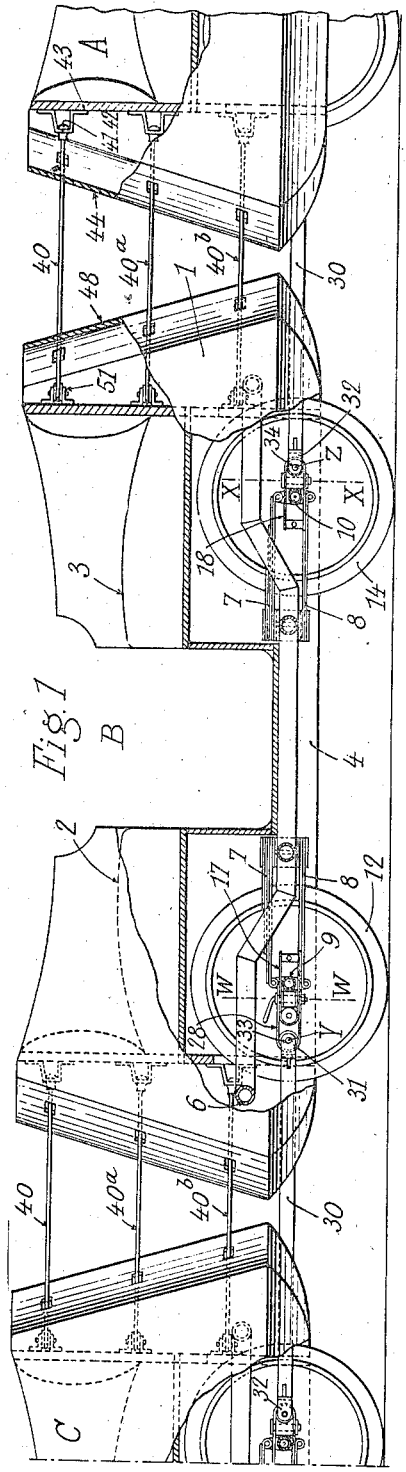
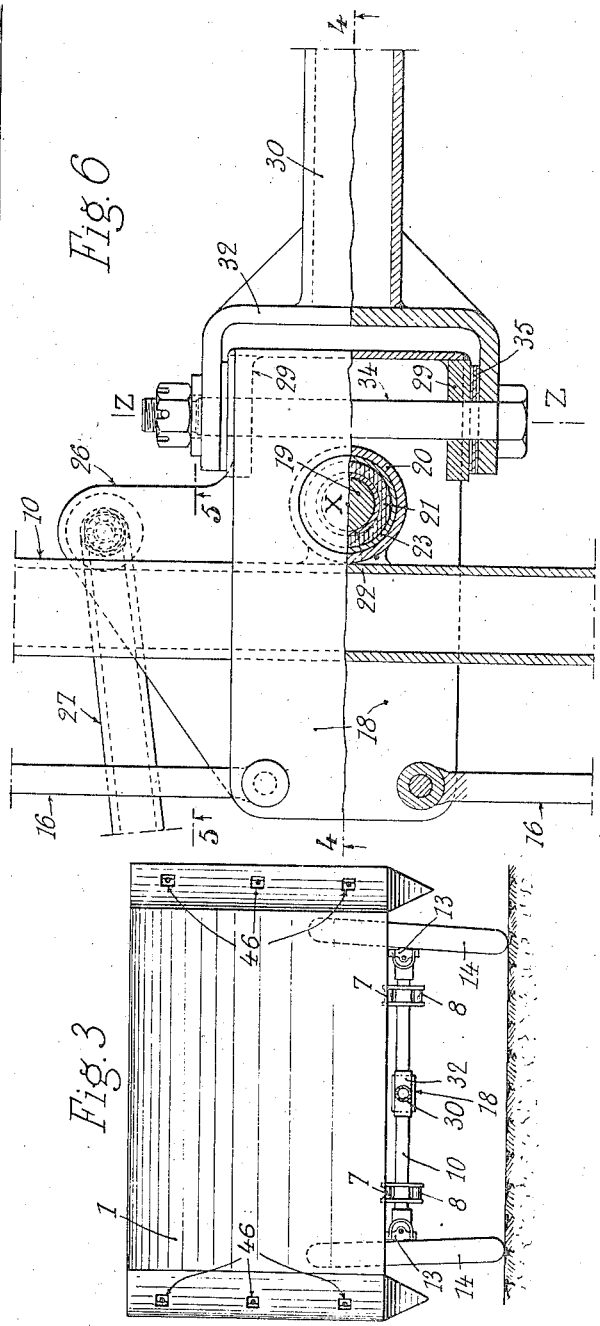
L. A. Verney
    Inventor
By: Glascock Downing & Seebold
          Attys.

Oct. 25, 1938.  L. A. VERNEY  2,134,628
VEHICLE COUPLING DEVICE
Filed Dec. 8, 1937  2 Sheets-Sheet 2
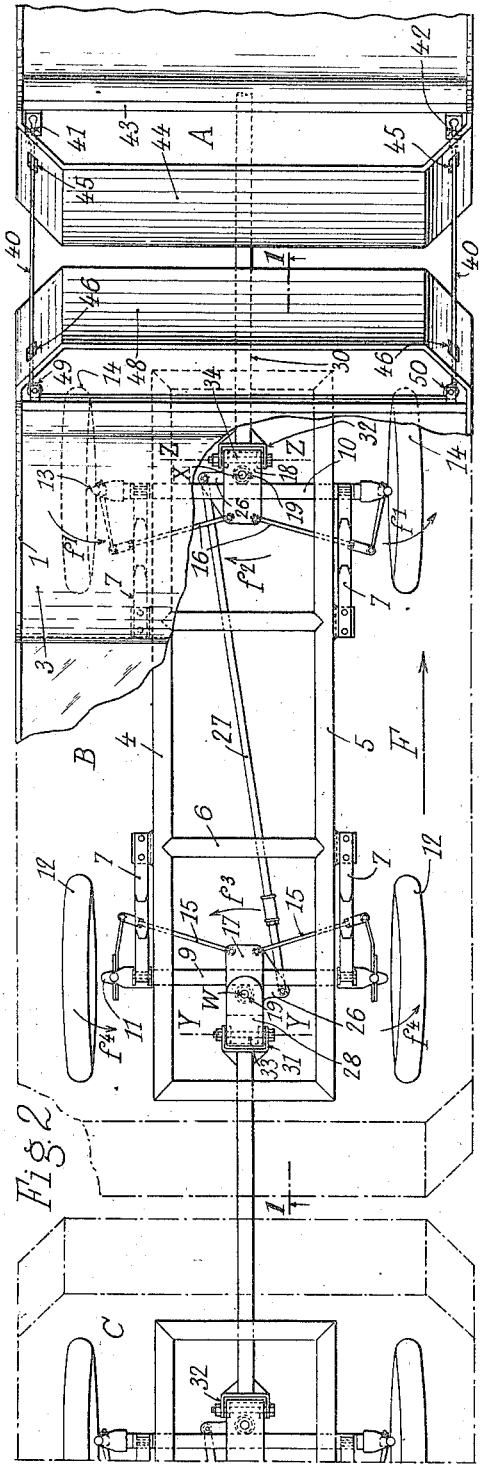
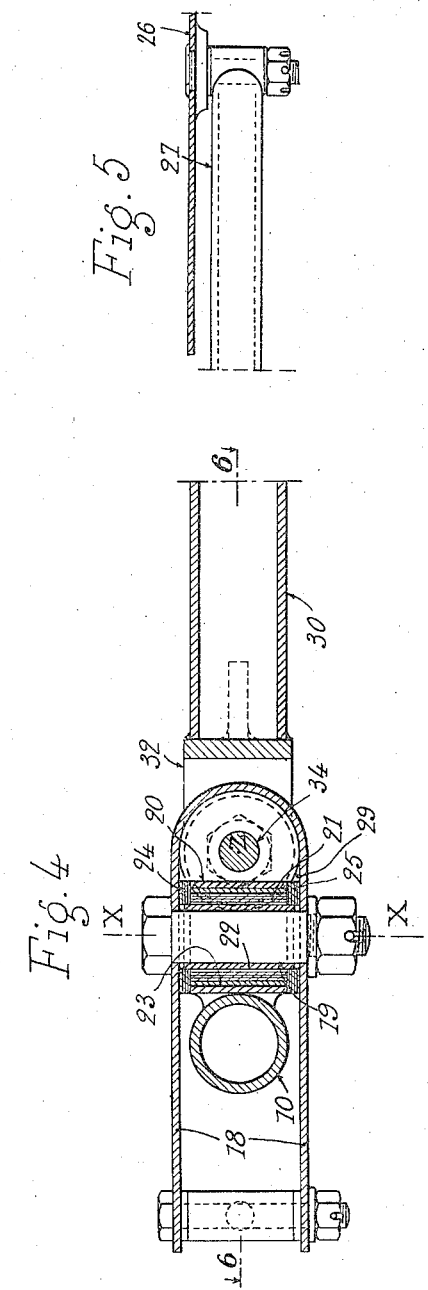
L. A. Verney
INVENTOR Patented Oct. 25, 1938

2,134,628

UNITED STATES PATENT OFFICE 2,134,628

VEHICLE COUPLING DEVICE

Louis Adolphe Verney, Paris, France, assignor to Societe Centrale de Chemins de Fer & d'Entreprises, Paris, France Application December 8, 1937, Serial No. 178,808
In France December 17, 1936

3 Claims. (Cl. 280—33.55)

Trains of vehicles having four steering wheels are known in which the trailed vehicles are connected to one another by means of a bent bar connecting the rear axle of the front vehicle to the frame or to the body of the rear vehicle. With such an arrangement, the vehicles have to be spaced relatively far apart from each other, and the coupling bar is quite visible between them.

One object of the present invention is to provide a coupling and trailing device in which the coupling bar is located very low on a level with the axles and can be covered by the bodies of the two vehicles which can be arranged as near together as desired, the shortest distance between two consecutive vehicles being only limited by the possibility of negotiating curves. The coupling bar is thus practically concealed and the length of the train formed is substantially reduced for the same number of vehicles.

A further object of this invention is to provide a coupling device which permits relative vertical displacements of two interconnected vehicle axles as well as angular displacements on negotiating curves.

A still further object of this invention is to provide means for avoiding any break in continuity between the vehicles and for preventing people of thoughtlessly walking between same, as may easily occur in very crowded places such as exhibition or amusement grounds, gardens, and the like.

The invention also consists of the vehicles and trains constructed and coupled with the above mentioned objects in view.

The invention will now be fully described with reference to the accompanying drawings in which:

Fig. 1 is a partial elevational, partial sectional view along the line 1—1 of Fig. 2, showing the connection of a vehicle with the two vehicles between which it is placed: (in this figure the link connecting together the two members which are pivoted on the axles has been omitted for greater clearness);

Fig. 2 is a corresponding plan view, the body of the vehicles being broken away;

Fig. 3 is a front view of a vehicle;

Fig. 4 is a longitudinal vertical section along the line 4—4 of Fig. 6 and on a larger scale, of the device for connecting the coupling bar to the front axle of a vehicle;

Fig. 5 is a similar section, along the line 5—5 of Fig. 6, showing the pivotal mounting of the link for connecting together the two members pivoted on the front axle and on the rear axle of the same vehicle;

Fig. 6 is a half plan and half sectional view along the line 6—6 of Fig. 4.

According to the embodiment shown, the coupling and trailing device is intended for coupling together vehicles such as A, B, C, forming a train, one (or a plurality) of said vehicles, for example the first of the train, being the driving vehicle, whereas the other or others form the trailed vehicles. The train moves in the direction of the arrow F (Fig. 2).

Each of said vehicles has a body 1 which can be of any kind (in the example shown, it has seats 2 and 3 placed opposite each other) and which rests on a frame formed by two longitudinal bearers 4 and 5 which are turned up at their two ends and connected together by cross-members 6.

Said frame (4, 5, 6) rests through the medium of four groups of two leaf springs 7 and 8 on two axles 9 and 10. At the ends of the rear axle 9 are pivoted the journals 11 of the two steering wheels 12. Similarly, on the ends of the front axle 10 are pivoted the journals 13 of the front steering wheels 14. The journals 11 and 13 are respectively connected by links 15, 16, pivoted at their two ends to a pivoting rear member 17 and to a pivoting front member 18. Said two members 17 and 18 are each formed as a fork and are arranged symmetrically relatively to the axles 9 and 10 over which they fit. Each of them is pivoted about a vertical axis WW or XX on the corresponding axle 9 or 10 by means of a pin 19 which passes through an eye 20 (Figs. 4, 6) which is fixed laterally on the axle by welding or otherwise. In order to damp the shocks when starting, a resilient ring 21 is inserted in said eye between two metal bushings 22 and 23 as known per se. Furthermore, washers 24 and 25 (Fig. 4) made of fibre or like material are interposed between the two arms of the fork 17 or 18 and the ends of the eye 20 of the bushing 23 and of the ring 21 in order to provide for a certain amount of friction.

The two members 17 and 18 carry laterally and on opposite sides thereof an ear 26. The two ears 26 are connected together by a link 27. It ensues that when the front wheels 14 oscillate for example in the direction of the arrows $f^1$ (Fig. 2) the links 16 cause the member 18 to oscillate about the axis XX in the direction of the arrow $f^2$; said member 18, in turn, causes the member 17 to oscillate in the opposite direction (arrow $f^3$) about its axis WW, through the medium of the link 27; the links 15 cause the rear wheels 12 to turn in the direction of the arrows $f^4$, in the opposite direction to that of the wheels 14, whereby the negotiation of curves of very small radius is greatly facilitated.

On the rear member 17 is pivoted about the same axis WW an auxiliary member 28 forming a fork.

The two members 28 and 18 have two rings 29 in the end of their loop (Figs. 4 and 6), which are fixed by welding or otherwise and form pivot eyes having transverse horizontal axes YY and ZZ.

The connection between two consecutive vehicles B and C for example is ensured by means of a straight rigid coupling bar 30. Said bar 30, which is preferably tubular, is terminated at each of its ends by a fork 31 or 32. The front fork 31 of each coupling bar is pivoted about the axis YY on the rear member 28 of the front vehicle B (for example) by means of a bolt 33. Similarly, the rear fork 32 of each coupling bar is pivoted by means of a bolt 34 (Figs. 1, 2, 4, 6) about the axis ZZ on the front member 18 of the rear vehicle C for example. The oscillations of the forks 32 or 33 are braked by means of discs 35 (Fig. 6) made of fibre or other material.

As the coupling bar 30 is pivoted about the two horizontal transverse axes YY and ZZ, the front axle 10 of the rear vehicle C and the rear axle 9 of the front vehicle B can undergo without drawback relative vertical movements due to the unevenness of the ground.

Moreover, in curves, the bar 30 follows the oscillations of the front intermediate member 18 of the rear vehicle C about the axis XX, but this is not incompatible with the oscillation in the opposite direction of the rear auxiliary member 17 of the front vehicle B, owing to the auxiliary member 28 which is pivoted about the axis WW on the axle 9.

The train can therefore negotiate curves of very small radius.

Furthermore, as the coupling bar 30 is straight and is fixed to the axles 9, 10 on a level with same, it is very low and is not connected to the bodies which can be as close together as is compatible with their satisfactory negotiation of curves.

According to a further feature of the invention, the vehicles A, B, C, are connected together by their opposite faces by means of three resilient or non-resilient flexible bonds 40, 40a and 40b arranged in three superposed horizontal planes. Said bonds which are made of rubber or other resilient or non-resilient material can be formed for example by belts, cables, chains, ropes, etc. Each of said bonds has the shape of a U in plan view. It is secured at its two ends by two adjustable or non-adjustable fasteners 41 and 42 of any kind, on the inside of one of the vehicles to any support or wall 43. Said bond passes freely through the front (or rear) wall 44 of the vehicle through two holes 45. It penetrates into the other vehicle through two other holes 46 provided in the rear or front wall 48 and, in said vehicle, it passes over two pulleys or like members 49, 50. Said pulleys are carried by forks 51 which are fixed to the wall or other support 52.

It will be appreciated that the three bonds 40, 40a, 40b, form two resilient barriers between two consecutive vehicles and in the immediate vicinity of the longitudinal faces of the train formed by said vehicles, whereby any discontinuity between two consecutive vehicles is avoided. As already stated, people are thus prevented from thoughtlessly walking between the two vehicles. A simple and light safety device is therefore provided.

Furthermore, the bonds 40, 40a, 40b always remain of constant length and can slide over their pulleys without strain. When the vehicles negotiate curves of very small radius, the difference of length between the inside and the outside of the curve is compensated without any tension on the bonds.

Of course, the invention is in no way limited to the embodiment illustrated and described which has only been chosen by way of example. Thus, the number of bonds may be any one desired (one, two, three and more). If necessary two consecutive vehicles could have one or a plurality of return pulleys, the bonds being folded in zig-zag shape between the two vehicles, and the ends of the bonds could be fixed at will either to the same vehicle, or to both vehicles.

Having now described my invention what I claim as new and desire to secure by Letters Patent is:

1. The combination with a vehicle having a front and a rear axle and wheel journals pivoted thereto, of a pivoting member mounted upon each axle for pivoting about a vertical axis, connecting means between each of said pivoting members and the journals mounted upon the same axle, said connecting means being adapted to cause said journals to pivot with said pivoting members in the same direction, other connecting means between the two pivoting members for causing one of said pivoting members to pivot in one direction when the other of said pivoting members pivots in the other, an auxiliary member pivotally connected to said rear axle for pivoting about the same vertical axis as the pivoting member carried by said rear axle and means provided on said auxiliary member and on the pivoting member mounted on the front axle for pivotally attaching a coupling bar so that it is adapted to pivot about a horizontal transverse axis.

2. The combination with a vehicle having a front and rear axle and wheel journals pivoted thereto, of two yoke-shaped pivoting members, on each of said axles a socket having a vertical axis, a bolt in the eye of said socket, a ring of elastic material inserted between said socket and said bolt, one of said yoke-shaped pivoting members being pivoted to each of the bolts, the socket being located between the two branches of the yoke-shaped pivoting member and said bolt extending through said branches, connecting means between each of said pivoting members and the journals mounted upon the same axle for causing said journals to pivot with said pivoting member in the same direction, other connecting means between the two pivoting members for causing one of said pivoting members to pivot in one direction when the other of said pivoting members pivots in the other direction, an auxiliary member pivoted about the bolt carried by the rear axle and means provided on said auxiliary member and on the front pivoting member for pivotally attaching the ends of a coupling bar so that it is adapted to pivot about a horizontal transverse axis.

3. A combination as claimed in claim 2, in which said last mentioned means and the ends of the coupling bar have radial contact surfaces and further comprising washers made of fibre inserted between said contact surfaces and between the ends of each socket and the branches of the yoke-shaped pivoting member, and means for exerting an adjustable pressure on said washers.

LOUIS ADOLPHE VERNEY.